UNITED STATES PATENT OFFICE.

NICHOLAS S. LUKEY, OF NEW ORLEANS, LOUISIANA.

IMPROVEMENT IN CATTLE-FOOD.

Specification forming part of Letters Patent No. 216,199, dated June 3, 1879; application filed March 4, 1879.

*To all whom it may concern:*

Be it known that I, NICHOLAS SEMPLE LUKEY, a resident of the city of New Orleans, parish of Orleans, and State of Louisiana, have invented a certain new and useful Improvement in Animal-Food; and I do hereby declare the following to be a full, clear, and correct description of the same.

This invention relates to the preparation of a nutritious article of cattle-food; and it consists in a composition formed by mixing together certain kinds of flour and meal with seeds, flowers of sulphur, salt, and other ingredients, as will hereinafter be more fully described.

To prepare, say, two thousand pounds of this food, take of locust-meal, eight hundred (800) pounds; Indian meal, eight hundred (800) pounds; oil-cake, two hundred (200) pounds; bean-flour, one hundred (100) pounds; turmeric, twenty-five (25) pounds; salt, twenty-five (25) pounds; dandelion, ten (10) pounds; fenugreek, ten (10) pounds; caraway-seed, ten (10) pounds; aniseed, ten (10) pounds; flowers of sulphur, ten (10) pounds; gentian, five (5) pounds; black antimony, five (5) pounds; and stir the same together until thoroughly mixed.

For the use of horses, cattle, &c., I saturate with warm water about one-half a pint of this compound, and mix the same with less than the usual quantity of oats, corn, or other food given at each meal.

For poultry it may be given in small quantities—say once or twice a day—in which case it will be found an excellent egg-producer as well as fattener.

Having described my invention, what I claim as new, and desire to secure by Letters Patent, is—

The improved cattle-food herein described, consisting of locust and Indian meals, oil-cake, bean-flour, turmeric, salt, dandelion, fenugreek, caraway-seed, aniseed, flowers of sulphur, gentian, and black antimony, in about the proportions herein set forth.

In testimony whereof I have hereunto signed my name.

N. S. LUKEY.

In presence of—
JNO. HELFFRICH,
PETER J. FINNEY.